: US 11,453,124 B2
(45) Date of Patent: Sep. 27, 2022

(54) TRAJECTORY PLANNING UNIT, VALVE ARRANGEMENT AND METHOD (71) Applicant: Festo SE & Co. KG, Esslingen (DE)

(72) Inventors: Valentin Falkenhahn, Stuttgart (DE); Daniel Klassen, Esslingen (DE); Rüdiger Neumann, Ostfildern (DE)

(73) Assignee: Festo SE & Co. KG, Esslingen (DE)

( * ) Notice: Subject to any disclaimer, the term of this patent is extended or adjusted under 35 U.S.C. 154(b) by 247 days.

(21) Appl. No.: 16/829,662

(22) Filed: Mar. 25, 2020

(65) Prior Publication Data

US 2020/0306966 A1 Oct. 1, 2020

(30) Foreign Application Priority Data

Mar. 29, 2019 (DE) .......................... 102019204484.0

(51) Int. Cl.
*B25J 9/16* (2006.01)
*G05B 19/44* (2006.01)

(52) U.S. Cl.
CPC ............ *B25J 9/1664* (2013.01); *G05B 19/44* (2013.01); *F15B 2211/755* (2013.01)

(58) Field of Classification Search
CPC ........... G05B 19/44; G05B 2219/43168; B25J 9/1664; F15B 2211/755; F15B 2211/6336
See application file for complete search history.

(56) References Cited

U.S. PATENT DOCUMENTS

2009/0045361 A1\* 2/2009 Nolle .................... F15B 13/086
251/12
2018/0229368 A1\* 8/2018 Leitner .................. B25J 9/1602

FOREIGN PATENT DOCUMENTS

DE          20105982 U1    8/2001
DE      102017102749 A1    8/2018
WO    WO-2009156069 A1 \* 12/2009 ......... G05B 19/4163

OTHER PUBLICATIONS

Tõnu Lehtla, "Introduction to Robotics, 3. Path and Trajectory Planning", https://web.archive.org/web/20180920171541 /http:// www.ene.ttu.ee:80/elektriaja mid/oppeinfo/materjal/ AAR0040/03 _ Robotics. pdf (Version vom Sep. 20, 2018) Herkunft: http://www. ene.ttu.ee/elektriajamid/projekt_3.php?keel=eng&leht=1 Abgerufen am (Jan. 31, 2020) 28 pages.

\* cited by examiner

*Primary Examiner* — Abiy Teka
(74) *Attorney, Agent, or Firm* — Hoffmann & Baron, LLP (57) ABSTRACT

A trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value comprising a velocity limit value, an acceleration limit value, a braking acceleration limit value and/or a jerk limit value. The trajectory planning unit is adapted to provide the trajectory according to at least one specification value which can be specified, the specification value including an initial velocity value, a final velocity value, an initial acceleration value and/or a final acceleration value.

17 Claims, 4 Drawing Sheets

TRAJECTORY PLANNING UNIT, VALVE ARRANGEMENT AND METHOD

BACKGROUND OF THE INVENTION

The invention pertains to a trajectory planning unit for providing a trajectory as a command variable for a control unit for position control of an actuator member of an actuator. The trajectory planning unit is adapted to provide the trajectory on the basis of a target position curve and to limit the trajectory according to at least one limit value. The at least one limit value comprises a velocity limit value, an acceleration limit value, a braking acceleration limit value and/or a jerk limit value.

DE 10 2017 102 749 A1 describes a trajectory generator with an input interface for reading in limit values for acceleration, jerk and velocity.

SUMMARY OF THE INVENTION

It is an object of the invention to provide a trajectory planning unit that can be used in a more flexible manner.

The object is solved by a trajectory planning unit adapted to provide the trajectory according to at least one specification value which can be specified. The specification value includes a trajectory velocity initial value, a trajectory velocity final value, a trajectory acceleration initial value and/or a trajectory acceleration final value.

Conventional trajectory planning units usually provide trajectories that have, as their initial state and their final state, respectively a stationary state—i.e. a state in which the velocity and the acceleration are zero.

In contrast thereto, it is possible with the present trajectory planning unit to specify, as the initial state and/or the final state for the trajectory, a state different from a stationary state. In particular, a trajectory can be provided in which a velocity and/or an acceleration different from zero is given at the beginning and/or at the end of the trajectory. The trajectory can thus in particular be used to transform a non-stationary initial state into a non-stationary final state that is different from the initial state. Furthermore, an initial stationary state can expediently be transformed into a final non-stationary state and/or an initial non-stationary state can be transformed into a final stationary state.

With the present trajectory planning unit, a trajectory can thus be provided which specifies a movement for the actuator member from an initial position to a final position, the actuator member having a velocity and/or an acceleration other than zero in the initial position and in the final position respectively.

The trajectory planning unit can therefore also be used for applications where a non-stationary state of the actuator member is required at the beginning and/or end of the movement to be performed. Consequently, the trajectory planning unit can be used more flexibly.

The invention further relates to a valve arrangement comprising a carrier body and a plurality of plate-shaped valve modules arranged in a row on the carrier body, and a control module arranged on the carrier body, which comprises a trajectory planning unit as described above.

The invention further relates to a method of operating a trajectory planning unit or valve arrangement described above, comprising the step of: providing the trajectory based on the target position curve, the at least one limit value and the at least one specification value.

Expediently, the method is adapted in correspondence to an embodiment of the trajectory planning unit and/or valve arrangement described here.

BRIEF DESCRIPTION OF THE DRAWINGS

Below, exemplary embodiments are described with reference to the figures. Thereby shows FIG. 1 a block diagram of a drive system with a trajectory planning unit, a control unit and an actuator, FIG. 2 a schematic representation of an exemplary embodiment of the drive system as a fluidic drive system, FIG. 3 Diagrams of a trajectory comprising a trajectory position signal, a trajectory velocity signal, a trajectory acceleration signal and a trajectory jerk signal, FIG. 4 Diagrams of a trajectory position signal and a velocity curve of the trajectory position signal.

DETAILED DESCRIPTION

Figure 1:
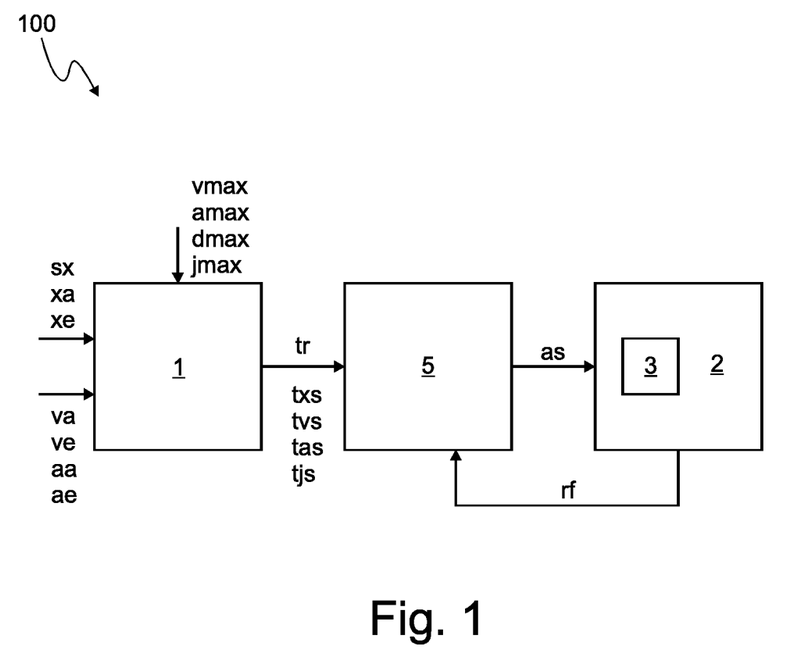

FIG. 1 shows a block diagram of a drive system 100 in which the trajectory planning unit 1 is exemplarily used. The trajectory planning unit 1 can also be provided by itself, i.e. independent of the drive system 100.

In addition to the trajectory planning unit 1, the drive system 100 comprises a control unit 5 and an actuator 2.

The trajectory planning unit 1 is adapted to provide a trajectory tr. The trajectory tr is fed to the control unit 5 as a command variable. The command variable can also be referred to as reference variable. The control unit 5 is adapted to perform a position control of an actuator member 3 of the actuator 2 using the trajectory tr as command variable. The position control is a closed-loop position control.

The trajectory planning unit 1 is adapted to provide the trajectory tr on the basis of a target position curve sx. The trajectory planning unit 1 is further adapted to limit the trajectory tr on the basis of at least one limit value. The at least one limit value comprises a velocity limit value vmax, an acceleration limit value amax, a braking acceleration limit value dmax and/or a jerk limit value jmax.

The trajectory planning unit 1 is further adapted to provide the trajectory tr according to at least one pre-definable specification value. The at least one specification value comprises a velocity initial value va, a velocity final value ve, an acceleration initial value aa and/or an acceleration final value ae.

The trajectory planning unit 1 thus has the particular advantage that it can generate the trajectory on the basis of one or more of the specified specification values. Expediently, the trajectory planning Unit 1 is additionally adapted to provide a trajectory based on the above-mentioned specification values, even if all specification values are set to zero. In this case, for example, a trajectory from a rest position to a rest position is provided. Expediently, the trajectory planning unit 1 is additionally adapted to provide a trajectory even if none of the above-mentioned specification values are specified.

Further exemplary details are explained below:

In the example in FIG. 1, the trajectory planning unit 1 is given the target position curve sx. As an example, the trajectory planning unit 1 receives the target position curve sx from external. The target position curve sx expediently comprises a final position value xe, which is to be reached with the actuator member 3. Expediently, the target position curve sx further includes an initial position value xa, from which the movement of the actuator member 3 to the final position value xe should start. In particular, the target position curve sx has the form of a jump function, preferably with a jump from xa to xe. The jump function may also be referred to as step function.

The trajectory planning unit 1 is adapted to provide the trajectory tr on the basis of the target position curve sx. The trajectory tr, like the target position curve sx, specifies a movement to the final position value xe (preferably starting from the initial position value xa), but (in contrast to the target position curve sx) takes one or more of the above-mentioned limit values into account, which result from the physical limitations of the movement of the actuator member 3. For example, the actuator member 3 is subject to the physical limitation that its position cannot be changed abruptly from the initial position value xa to the final position value xe. Accordingly, the trajectory planning unit 1 converts the jump given by the target position curve sx into a continuous position curve which can be carried out by the actuator member 3, and provides the continuous position curve as the trajectory tr. The position curve provided as the trajectory tr is in particular twice continuously differentiable.

Expediently, the trajectory planning unit 1 is adapted to provide the trajectory tr in real time on the basis of the target position curve sx. In particular, the trajectory planning unit 1 is adapted to convert the target position curve sx into the trajectory tr in real time. The trajectory planning unit 1 is expediently provided by means of a program running on a microcontroller, which program is executed in particular as a real-time program and/or deterministic program. Expediently, the trajectory planning unit 1 is a real-time system.

The trajectory planning unit 1 is adapted to output the trajectory tr to the control unit 5. Expediently, the output trajectory tr includes a trajectory position signal txs, a trajectory velocity signal tvs, a trajectory acceleration signal tas and/or a trajectory jerk signal tjs.

The control unit 5 is adapted to carry out a position control of the actuator member 3 of the actuator 2. The control unit 5 may also be referred to as closed-loop-control unit. The control unit 5 receives exemplarily a feedback variable rf from the fluidic actuator 2, for example an actual position, actual velocity and/or actual acceleration of the actuator member 3 The control unit 5 is adapted to provide, on the basis of the feedback variable rf and the trajectory tr, a control signal "as" for controlling the actuator 2 in order to control the position, velocity and/or acceleration of the actuator member 3 to the trajectory. Expediently, the control unit 5 calculates a deviation between the trajectory tr and the feedback variable rf and outputs the control signal "as" such that the deviation is minimized.

In the following, the at least one limit value will be discussed in more detail:

The trajectory planning unit 1 takes into account as a limit value for the generation of the trajectory exemplarily the velocity limit value vmax, the acceleration limit value amax, the brake acceleration limit value dmax and the jerk limit value jmax. Exemplarily, the trajectory planning unit 1 receives one or more of the limit values from external. Alternatively or additionally, one or more of the limit values can be provided by the trajectory planning unit 1 itself.

According to a preferred embodiment, the trajectory planning unit 1 is adapted to provide the trajectory tr in compliance with the four limit values mentioned above. These four limit values can be specified, for example.

According to alternative embodiments, the trajectory planning unit 1 is adapted to limit the trajectory tr on the basis of a subset of the four limit values mentioned above. According to these alternative embodiments, fewer than the four limit values can thus be specified.

The trajectory planning unit 1 is expediently adapted to provide the trajectory tr such that every specified limit value is met. The provided trajectory tr thus has as maximum velocity an absolute velocity equal to or less than the velocity limit value vmax (if specified), as maximum acceleration an acceleration equal to or less than the acceleration limit value amax (if specified), as maximum braking acceleration an acceleration greater than or equal to the negative braking acceleration limit value dmax (if specified), and as maximum jerk an absolute jerk equal to or less than the jerk limit value jmax (if specified).

The trajectory planning unit 1 is expediently adapted to allow an initial violation of the limit values if an initial velocity value va and/or an initial acceleration value aa lies outside the mentioned limit values and then to achieve a state in which the limit values are observed as quickly as possible.

In the following, the specification of the at least one specification value will be discussed in more detail:

The trajectory planning unit 1 is given as the at least one specification value exemplarily the initial velocity value va, the final velocity value ve, the initial acceleration value aa and the final acceleration value ae. As an example, the trajectory planning unit 1 receives one or more of the specification values from external. Alternatively or additionally, one or more of the specification values can be provided by the trajectory planning unit 1 itself.

For example, the initial velocity value va, the final velocity value ve, the initial acceleration value aa and/or the final acceleration value ae can be freely selected. Expediently, the initial velocity value va, the final velocity value ve, the initial acceleration value aa and/or the final acceleration value ae are otherwise (e.g. when they are not specified) set to zero automatically. Expediently, the final velocity value ve is greater than or equal to zero.

According to a preferred embodiment, the trajectory planning unit 1 is adapted to provide the trajectory tr on the basis of the above four specification values. These four specification values can therefore be specified according to this embodiment.

In accordance with alternative embodiments, the trajectory planning unit 1 is adapted to provide trajectory tr on the basis of a subset of the above four specification values. According to these alternative configurations, fewer than four specification values can be specified, wherein at least one specification value is specified.

Expediently, the trajectory planning unit 1 is adapted to perform the provision of the trajectory tr according to one, several or all of the above-mentioned permutations.

Expediently, the trajectory planning unit 1 is adapted to allow the user to freely select one or more specification values which are not specified. Expediently, these specification values are set to zero. In particular, the trajectory planning unit 1 is adapted to set specification values that are not specified to zero.

Expediently, one, several or all of the specification values are different from zero.

Expediently, one, several or all of the specification values are specified variably. A variable specification means in particular that the specification value changes over time. Expediently, the specification value is specified anew, in particular changed, for each generation of a trajectory.

According to another preferred embodiment, at least the final velocity value ve and the final acceleration value ae are specified and in particular are not equal to zero. The trajectory planning unit 1 is adapted to provide the trajectory tr according to the specified final velocity value ve and the specified final acceleration value ae.

According to another preferred embodiment, at least the initial velocity value va and the initial acceleration value aa are specified and in particular are not equal to zero. The trajectory planning unit 1 is adapted to provide the trajectory tr according to the specified initial velocity value va and the specified initial acceleration value aa.

The trajectory planning unit 1 is expediently adapted to provide the trajectory tr such that every specification value is fulfilled. The provided trajectory tr thus has the initial velocity value va (if specified) as the initial velocity, the final velocity value ve (if specified) as the final velocity, the initial acceleration value aa (if specified) as the initial acceleration and the final acceleration value ae (if specified) as the final acceleration.

The trajectory planning unit 1 is expediently adapted to provide the trajectory tr as a time-optimized trajectory, i.e. in particular as a trajectory which, starting from the initial position value xa, reaches the final position value xe in minimum time. The trajectory planning unit 1 is especially adapted to provide the trajectory tr such that, on the way from the initial position value xa to the final position value xe, it does not pass through a stationary state, i.e. a state in which the velocity and acceleration are simultaneously zero.

Figure 2:
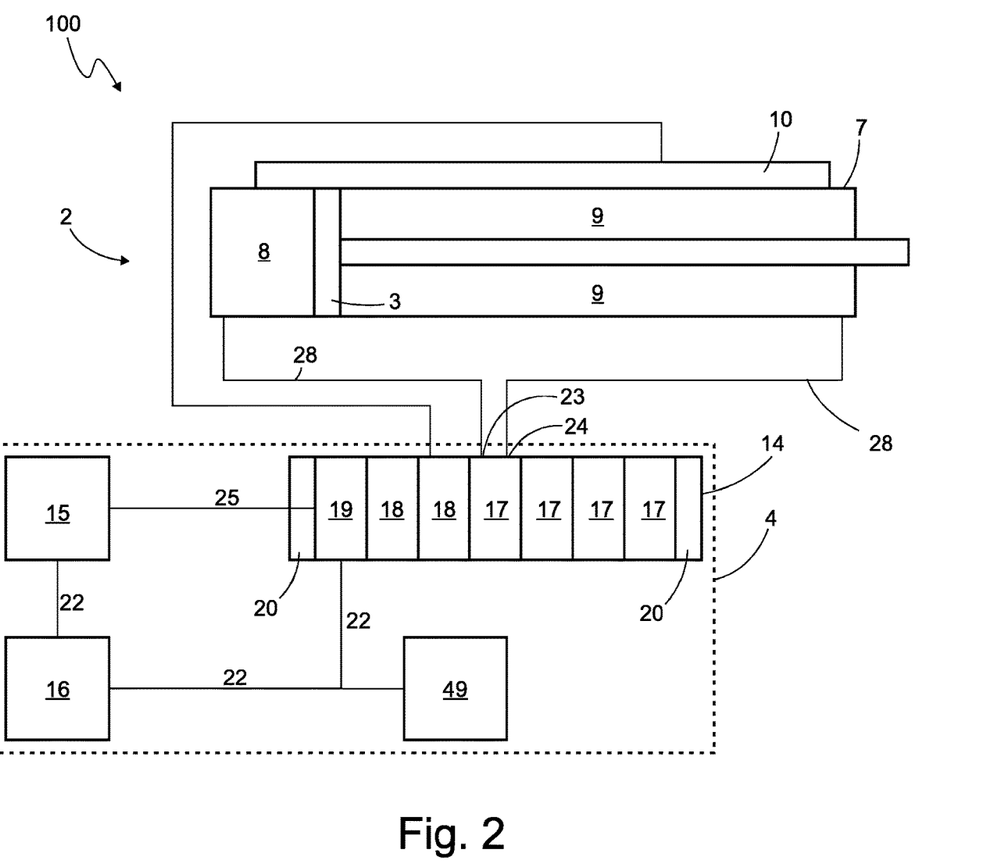

FIG. 2, which shows an exemplary embodiment of the drive system 100, will be discussed in more detail below.

The drive system 100 is here adapted as a fluidic drive system, in particular as a pneumatic drive system.

The actuator 2 is a fluid actuator, especially a pneumatic actuator. As an example, the actuator 2 is a drive cylinder with a cylinder body 7 relative to which the actuator member 3 can be moved. The actuator member 3 is exemplarily designed as a piston with a piston rod. The actuator member 3 divides the inner space of the cylinder body 7 into a first pressure chamber 8 and a second pressure chamber 9. By pressurizing the pressure chambers 8, 9 with a pressurized fluid, e.g. compressed air, a driving force can be exerted on the actuator member 3 to set the actuator member 3 in motion. The actuator 2 is exemplarily designed as a double-acting drive cylinder. According to an alternative embodiment, the actuator 2 has only one pressure chamber and is accordingly designed as a single-acting drive cylinder.

On the fluidic actuator 2, a position sensor device 10 is provided, by means of which the actual position, actual velocity and/or actual acceleration of the actuator member 3 can be detected. For example, the actual position is measured by means of the position sensor device 10 and the actual velocity and/or the actual acceleration are calculated based on the first derivative and/or the second derivative of the actual position.

The drive system 100 includes, as an example, a pressure fluid provision device 4. The pressure fluid provision device 4 is adapted to provide the control signal "as" for the control of the actuator 2. The control signal "as" is a fluidic signal, especially a pneumatic signal.

As an example, the pressure fluid provision device 4 comprises a valve arrangement 14 with two pressure outlets 23, 24, which are connected to the pressure chambers 8, 9 via fluid connections 28. The pressure fluid provision device 4 is adapted to output fluidic, in particular pneumatic, signals at its pressure outlets 23, 24 as the control signal "as", in order to supply the pressure chambers 8, 9 with the pressure fluid and to set the actuator member 3 in motion.

The valve arrangement 14 comprises, for example, an in particular plate-shaped carrier body 20 and a plurality of plate-shaped valve modules 17 arranged in a row on the carrier body 20. The valve arrangement 14 is designed in particular as a valve terminal. As an example, one, several or all valve modules 17 comprises a bridge circuit of four 2/2-way valves, each of which expediently comprises pilot valves, each of which is designed as a piezo valve. Expediently, a valve module 17 provides the two pressure outlets 23, 24.

The valve arrangement 4 expediently includes an input/output module 18, which is communicatively connected to the position sensor device 10.

Expediently, the valve arrangement 4 further includes a control module 19, which is arranged in particular on the carrier body 20 and is adapted to detect the actual position of the actuator member 3 by means of the position sensor device 10. The control module 19 is further adapted to control the valve module 17 in order to provide the control signal "as"—exemplary the fluidic signals at the pressure outlets 23, 24.

The pressure fluid provision device 4, in particular the valve arrangement 14, is adapted to provide the trajectory planning unit 1 and/or the control unit 50, in particular by means of a program, in particular an application program. The program is executed in particular by the control module 19, for example a microcontroller of the control module 19. The program is especially adapted to generate the trajectory tr on the basis of the target position curve sx, the at least one limit value and the at least one specification value. The program is further adapted to perform a position control of the actuator member 3 on the basis of the trajectory tr.

The drive system 100 expediently further comprises a superordinate control system 15, for example a programmable logic controller, PLC, a cloud server 16, in particular a cloud server 16 located geographically remote from the actuator 2, and/or a user device 49, for example a mobile device such as a smartphone, tablet and/or laptop and/or a desktop computer.

The superordinate controller 15 is exemplarily connected to the valve arrangement 14 via a local communication link 25, for example a local network.

The cloud server 16 and/or the user device 49 is exemplarily communicatively connected via a wide area network 22, in particular the Internet, to each other, to the superordinate controller 15 and/or to the valve arrangement 14.

The superordinate controller 15 is expediently adapted to provide the target position curve sx and/or the at least one limit value and/or the at least one specification value.

The trajectory planning unit 1 (provided exemplarily on the valve arrangement 14) is adapted to receive at least one specification value from the superordinate controller 15. In particular, the trajectory planning unit 1 receives the final velocity value ve and/or the final acceleration value ae from the superordinate controller 15. Alternatively or additionally, the trajectory planning unit 1 can receive the initial velocity value va and/or the initial acceleration value ae from the superordinate controller 15.

Furthermore, it is also possible that the trajectory planning unit 1 receives the initial velocity value va and/or the initial acceleration value aa from the control unit 5. For example, the trajectory planning unit 1 receives, as the initial velocity value va, the actual velocity and/or, as the initial acceleration value aa, the actual acceleration.

Furthermore, it is also possible that the trajectory planning unit 1 uses, as the initial velocity value va and/or the initial acceleration value aa, a final velocity value and/or a final acceleration value of a trajectory previously provided by the trajectory planning unit 1.

According to a further embodiment, the specification value is provided by the cloud server 16 and/or the user device 49, for example based on a user input.

The cloud server 16 is expediently adapted to transfer the program, in particular the application program, with which the trajectory planning unit 1 and/or the control unit 5 can be provided, to the valve arrangement 14 so that it can be executed on the valve arrangement 14. The transmission to the valve arrangement 14 takes place in particular in response to a user request from the user unit 49.

As described above, the trajectory planning unit 1 is preferably provided on the valve arrangement 14. According to an alternative embodiment, the trajectory planning unit 1 is provided by the superordinate controller 15, the cloud server 16 and/or the user device 49.

As an alternative to the described design of the drive system 100 as a fluidic drive system, the drive system 100 can also be designed differently, for example as an electric drive system in which the actuator member is driven by an electric drive.

Figure 3:
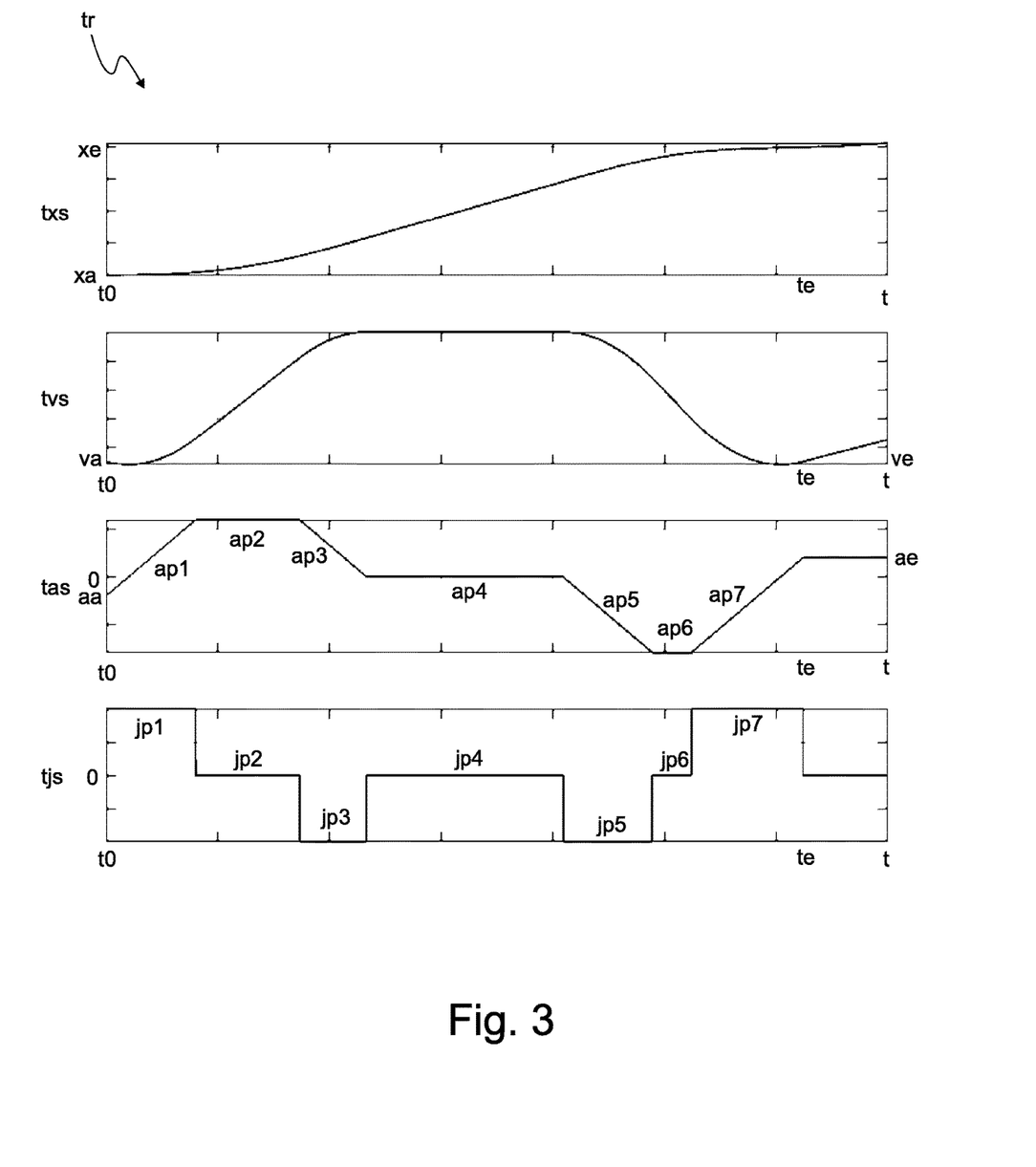

FIG. 3 shows an exemplary trajectory tr. The trajectory tr includes an exemplary trajectory position signal txs. Optionally, the trajectory tr also includes a trajectory velocity signal tvs, a trajectory acceleration signal tas and/or a trajectory jerk signal tjs. The trajectory velocity signal tvs is the first derivative of the trajectory position signal txs, the trajectory acceleration signal tas is the second derivative of the trajectory position signal txs and the trajectory jerk signal tjs is the third derivative of the trajectory position signal txs.

The trajectory position signal txs, the trajectory velocity signal tvs, the trajectory acceleration signal tas and/or the trajectory jerk signal tjs are all one-dimensional signals. Preferably, the trajectory position signal txs, the trajectory velocity signal tvs, the trajectory acceleration signal tas and/or the trajectory jerk signal tjs each comprise a plurality of (in particular temporally) successive signal values. The signal values are expediently scalar signal values.

The trajectory position signal txs specifies exemplarily a linear motion and/or a rotary motion for the actuator member 3, whereby the positions passed through during the specified motion are each represented by a one-dimensional, in particular a scalar, signal value.

The trajectory position signal txs is expediently a continuous trajectory position signal, the trajectory velocity signal tvs is expediently a continuous, consistent trajectory velocity signal, the trajectory acceleration signal tas is expediently a continuous, consistent trajectory acceleration signal and/or the trajectory jerk signal is expediently a continuous, consistent trajectory jerk signal. The mentioned consistency refers especially to the trajectory position signal txs.

According to a preferred embodiment, the trajectory tr comprises the trajectory position signal txs and the trajectory velocity signal tvs. The trajectory position signal txs is provided to a controller element of the control unit 5 and the trajectory velocity signal tvs is provided to a pilot element of the control unit 5. The pilot element may also be referred to as feedforward element.

According to a particularly preferred configuration, the trajectory tr comprises the trajectory position signal txs, the trajectory velocity signal tvs, the trajectory acceleration signal tas and/or the trajectory jerk signal tjs. The trajectory position signal txs, the trajectory velocity signal tvs and/or the trajectory acceleration signal tas is expediently provided to a controller element of the control unit 5 and the trajectory position signal txs, the trajectory velocity signal tvs, the trajectory acceleration signal tas and/or the trajectory jerk signal tjs is expediently provided to a pilot element of the control unit 5. The pilot element may also be referred to as feedforward element.

The shown trajectory tr is provided by the trajectory planning unit 1, based on a target position curve sx, which at time t0 specifies a position jump from the initial position value xa to the final position value xe.

According to this target position curve sx the trajectory planning unit 1 outputs the trajectory tr with the trajectory position signal txs. The trajectory position signal txs runs from the initial position value xa to the final position value xe. At the time to the trajectory position signal txs reaches the final position value xe. The trajectory planning unit 1 is especially adapted to provide the trajectory position signal txs as a continuous signal. As an example, the trajectory planning unit 1 is further adapted to provide the trajectory position signal txs as a signal which is continuous in its first derivative and its second derivative. As can be seen in FIG. 3, the trajectory velocity signal tvs and the trajectory acceleration signal tas are also continuous signals, i.e. they do not have any jump. The third derivative—the trajectory jerk signal tjs—is exemplarily not continuous and thus has jumps.

Expediently, the trajectory planning unit 1 is adapted to provide the time te and/or the time difference from t0 to te, expediently before the actuator member 3 reaches the final position value xe and/or before the actuator member 3 is driven according to the trajectory tr.

Expediently, the trajectory planning unit 1 provides the trajectory position signal txs in accordance with the velocity limit value vmax, the acceleration limit value amax, the braking acceleration limit value dmax and the jerk limit value jmax. The maximum velocity (i.e. the first derivative) is equal to or less than the velocity limit vmax, the maximum acceleration (i.e. the second derivative) is equal to or less than the acceleration limit amax and greater than or equal to the negative braking acceleration limit dmax, and the maximum jerk (i.e. the third derivative) is equal to or less than the jerk limit jmax.

The trajectory planning unit 1 is adapted to plan the trajectory in such a way that the limit values are only violated for as short a time as possible if the initial velocity value va and/or the initial acceleration value aa lie outside the mentioned limit values.

The trajectory planning unit 1 provides the trajectory position signal txs according to the at least one specification value. The initial velocity value of the trajectory position signal txs—i.e. the velocity at time t0—is equal to the specified initial velocity value va. The final velocity value of the trajectory position signal txs—i.e. the velocity at time te—is equal to the specified final velocity value ve. The initial acceleration value of the trajectory position signal txs—i.e. the acceleration at time t0—is equal to the specified initial acceleration value aa. The final acceleration value of the trajectory position signal txs—i.e. the acceleration at time te—is equal to the specified final acceleration value ae.

The trajectory planning unit 1 is expediently adapted to generate the trajectory position signal txs with plural acceleration phases. The acceleration phases each have a positive, negative or no gradient. Furthermore, the acceleration phases each show no curvature.

The acceleration phases comprise a first acceleration phase ap1, a second acceleration phase ap2, a third acceleration phase ap3, a fourth acceleration phase ap4, a fifth acceleration phase ap5, a sixth acceleration phase ap6 and a seventh acceleration phase ap7. The acceleration phases directly follow each other in the order mentioned. The first acceleration phase ap1 starts at time t0 and the seventh acceleration phase ap7 ends at time te.

As an example, the first acceleration phase ap1 is a first rising phase with positive slope. The second acceleration phase ap2 is a first plateau phase with constant positive acceleration. The third acceleration phase ap3 is a first falling phase with negative slope. The fourth acceleration phase ap4 is a second plateau phase with zero acceleration. The fifth acceleration phase ap5 is a second falling phase with negative slope. The sixth acceleration phase ap6 is a third plateau phase with constant negative acceleration. The seventh acceleration phase ap7 is a second rising phase with positive slope.

The third derivative of the trajectory position signal txs—the trajectory jerk signal tjs—accordingly has seven jerk phases. The value of each jerk phase is constant. Between the jerk phases there is a respective signal jump. The jerk phases comprise, as examples, a first jerk phase jp1 with constant positive jerk, a second jerk phase jp2 with constant zero jerk, a third jerk phase jp3 with constant negative jerk, a fourth jerk phase jp4 with constant zero jerk, a fifth jerk phase jp5 with constant negative jerk, a sixth jerk phase jp6 with constant zero jerk and a seventh jerk phase jp7 with constant positive jerk.

In the following, it will be discussed in more detail how the trajectory planning unit 1 generates the trajectory tr so that the at least one limit value and the at least one specification value are fulfilled. The procedure discussed in the following is particularly suitable for generating the trajectory tr in real-time, especially on a microcontroller.

The trajectory planning unit 1 is adapted to generate the trajectory tr using a trajectory generation procedure. Within the trajectory generation procedure, the trajectory planning unit 1 first generates a first acceleration curve that fulfils the at least one limit value and the at least one specification value.

The first acceleration curve can also be called the first internal acceleration curve. Expediently, the first acceleration curve is an internal intermediate result and is preferably not output by the trajectory planning unit 1, especially not as trajectory tr.

The trajectory planning unit 1 is adapted to generate the first acceleration curve on the basis of an acceleration profile that has several predetermined acceleration phases. The acceleration phases are predetermined in particular in that they have a slope or no slope, that the sign of the slope is positive or negative and that they have no curvature. Expediently, the acceleration phases are straight lines.

The acceleration phases of the acceleration profile correspond exemplarily to the acceleration phases of the trajectory acceleration signal tas discussed above. Thus, the acceleration profile comprises as a first acceleration phase a first rising phase with positive slope, as a second acceleration phase a first plateau phase with constant positive acceleration, as a third acceleration phase a first falling phase with negative slope, as a fourth acceleration phase a second plateau phase with zero acceleration, as a fifth acceleration phase a second falling phase with negative slope, as a sixth acceleration phase a third plateau phase with constant negative acceleration and as a seventh acceleration phase a second rising phase with positive slope.

According to a preferred embodiment, the acceleration profile is as explained above, but the first acceleration phase is a phase with selectively a positive or a negative slope and/or the third acceleration phase is a phase with selectively a positive or a negative slope.

Expediently, the trajectory planning unit 1 limits the acceleration—i.e. the signal value—of the first acceleration curve to or below the acceleration limit amax and to or above the braking acceleration limit dmax. Furthermore, the trajectory planning unit 1 limits the gradient of the first acceleration curve to or below the jerk limit value jmax. Furthermore, the trajectory planning unit 1 limits the gradient of the first acceleration curve and/or the time durations of the acceleration phases in such a way that the sum of the initial velocity value va and the integral of the first acceleration curve is less than or equal to the velocity limit value vmax.

Furthermore, the trajectory planning unit 1 sets the initial value of the first acceleration curve to the initial acceleration value aa and the final value of the first acceleration curve to the final acceleration value ae. Furthermore, the trajectory planning unit 1 adjusts the slope of the first acceleration curve and/or the time durations of the acceleration phases in such a way that the sum of the initial velocity value va and the integral of the acceleration curve is equal to the final velocity value ve.

Expediently, the trajectory planning unit 1 is adapted not to take into account the target position curve sx when generating the first acceleration curve. When generating the first acceleration curve, the trajectory planning unit 1 initially only fulfils the limit value—exemplarily the velocity limit value vmax, the acceleration limit value amax, the braking acceleration limit value dmax and the jerk limit value jmax—and the at least one specification value—exemplarily the initial velocity value va, final velocity value ve, initial acceleration value aa and final acceleration value ae. The target position curve sx, in particular the final position value xe, is expediently not taken into account when generating the first acceleration curve and in particular is not fulfilled.

The trajectory planning unit 1 is expediently adapted to generate, within the trajectory generation procedure, a second acceleration curve based on the first acceleration curve. The trajectory planning unit 1 generates the second acceleration curve in such a way that the final position value xe, and expediently also the initial position value xa, is fulfilled.

The trajectory planning unit 1 is in particular adapted to adjust, for generating the second acceleration curve, the time durations of one or more of the acceleration phases so that the final position value xe contained in the target position curve sx, and expediently also the initial position value xa, is fulfilled.

For example, the trajectory planning unit 1 is adapted to adjust, for the generation of the second acceleration curve, the duration of the fourth acceleration phase so that the final position value xe is reached. Alternatively or in addition, the trajectory planning unit 1 is adapted to adjust the duration of one or more of the first three acceleration phases in order to adjust the velocity during the fourth acceleration phase so that the final position value xe is reached. Expediently, the trajectory planning unit 1 is adapted to adjust the duration of one or more of the last three acceleration phases in correspondence with the first three acceleration phases in order to continue to reach the specified final velocity value ve at the time te.

Expediently, the trajectory planning unit 1 is adapted not to add any additional acceleration phases when generating the second acceleration curve.

The trajectory planning unit 1 is expediently adapted to generate the trajectory tr on the basis of the second acceleration curve. As an example, the trajectory planning unit 1 provides the trajectory position signal txs as a double integral of the second acceleration curve. Expediently, the trajectory planning Unit 1 provides the trajectory velocity signal tvs as an integral of the second acceleration curve. Expediently, the trajectory planning unit 1 provides the second acceleration curve as the trajectory acceleration signal tas. Expediently, the trajectory planning unit 1 provides the trajectory jerk signal tjs as a derivative of the second acceleration curve.

The trajectory planning unit 1 is in particular adapted to provide the trajectory position signal txs and/or the trajectory velocity signal tvs on the basis of the second acceleration curve numerically and/or using an approximation method, in particular by numerical integration.

The trajectory planning unit 1 is in particular adapted to calculate the trajectory position signal txs and/or the trajectory velocity signal tvs from the time durations of the acceleration phases of the second acceleration curve, in particular by phase-segment-wise analytical calculation using polynomials.

The trajectory planning unit 1 is in particular adapted to set, for the provision of the trajectory jerk signal tjs, the individual jerk phases selectively to zero, to a positive jerk maximum value +jmax or to a negative jerk maximum value −jmax.

The trajectory planning unit 1 is expediently adapted to check whether the final position value xe can be fulfilled together with the least one specification value. The trajectory planning unit 1 is further adapted to provide, in the case where the trajectory planning unit 1 comes to the test result that the simultaneous fulfilment of the final position value xe and the specification value is not possible, an auxiliary trajectory which fulfils the final position value xe and does not fulfil the at least one specification value.

For example, the case can occur that the final position value xe is exceeded for every possible adaptation of the first acceleration curve (while maintaining the at least one specification value).

If the final position value xe cannot be fulfilled together with the specification value, the trajectory planning unit 1 prioritizes the final position value xe and provides an auxiliary trajectory accordingly. The control unit 5 then carries out the position control of the actuator member 3 on the basis of the auxiliary trajectory.

The trajectory planning unit 1 expediently provides, as the auxiliary trajectory, the trajectory tr according to the second acceleration curve, up to the time when the final position value xe is reached. This can happen, for example, at a time when the velocity and/or acceleration do not correspond to the respective specification value.

After the final position value xe and/or the final time value to the trajectory is expediently continued according to the final values, as long as not or until a new trajectory is planned.

Figure 4:
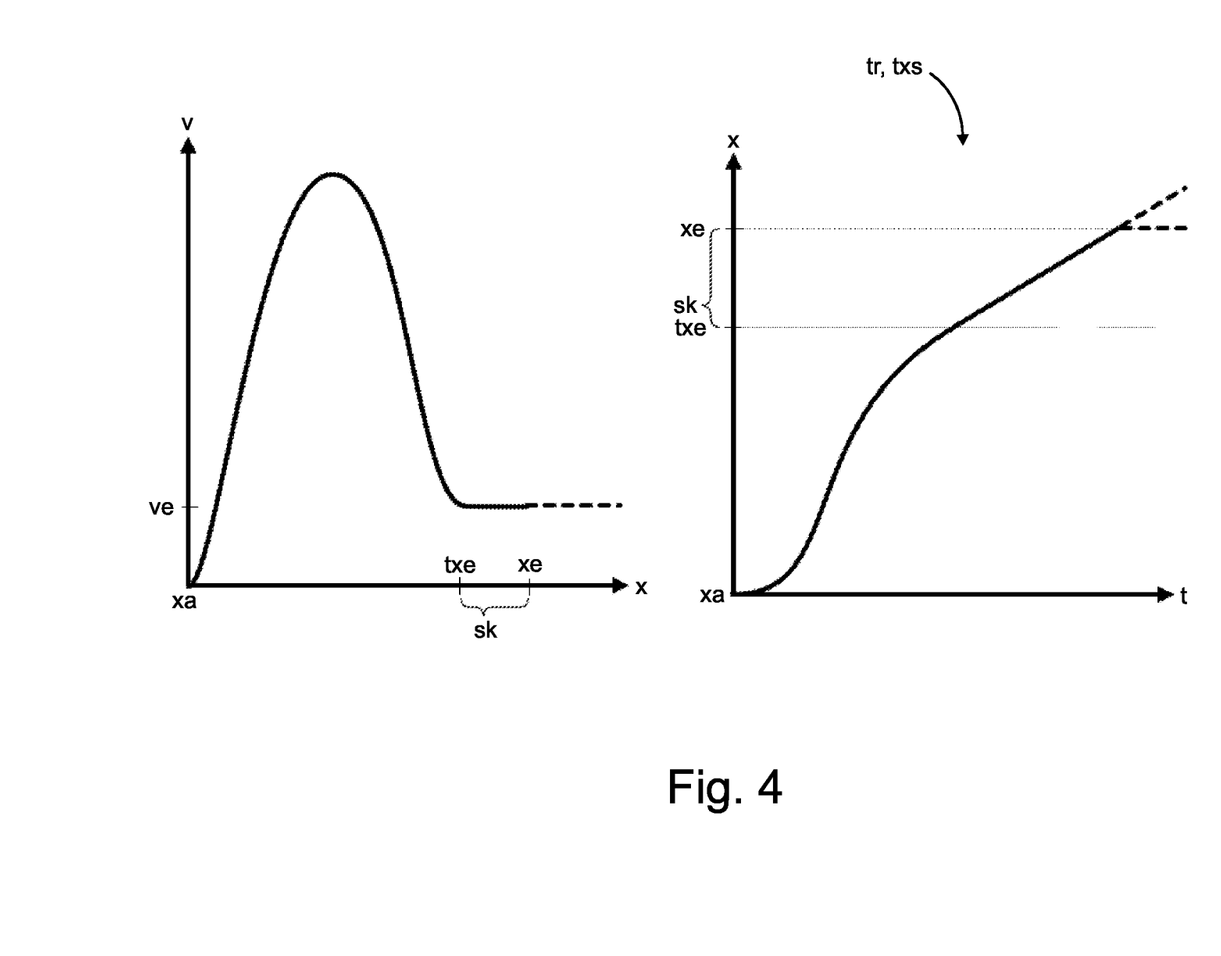

FIG. 4 shows a trajectory tr, which includes a creepage distance sk. In the right diagram of FIG. 4 the trajectory position signal txs is plotted over time t and in the left diagram of FIG. 4 the velocity of the trajectory position signal txs is plotted over position x.

The creepage distance sk is a section before the final position value xe, in which section the trajectory position signal txs approaches the final position value xe at a predetermined, in particular reduced, velocity, exemplarily with the final velocity value ve.

The trajectory planning unit 1 is adapted to provide the trajectory tr with the creepage distance sk, expediently automatically and/or in response to user input and/or in response to a command from the superordinate controller 15.

The trajectory planning unit 1 is adapted to provide, for providing the creepage distance sk, the trajectory tr with a final trajectory position value txe, which is offset forward with respect to the final position value xe—i.e. in particular in the direction towards the actual position and/or the initial position value xa. In particular, the trajectory final position value txe is offset by a predetermined and/or user-definable distance—the creepage distance sk—in the direction towards the initial position value xa. On the whole section between the trajectory final position value txe and the final position value xe, the velocity of the trajectory tr is equal to the final velocity value ve.

According to a further embodiment, trajectory planning unit 1 is adapted to provide a first trajectory and a second trajectory following the first trajectory and to use the final velocity value and/or the final acceleration value of the first trajectory as the initial velocity value and/or initial acceleration value of the second trajectory. The trajectory planning unit 1 is expediently adapted to provide a plurality, in particular three or more, of trajectories and to use, as the initial velocity value and/or initial acceleration value of a respective trajectory, the final velocity value and/or the final acceleration value of the respective preceding trajectory.

What is claimed is:

1. A trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value, the limit value comprising a velocity limit value, an acceleration limit value, a braking acceleration limit value and/or a jerk limit value, wherein the trajectory planning unit is adapted to provide the trajectory in accordance with at least one specification value which can be specified, the specification value comprising a velocity initial value, a velocity final value, an acceleration initial value and/or an acceleration final value, and wherein the trajectory planning unit is adapted to generate the trajectory by performing a trajectory generation procedure, and to generate, within the trajectory generation procedure, a first acceleration curve, which satisfies the at least one limit value and the at least one specification value.

2. The trajectory planning unit according to claim 1, wherein the at least one specification value comprises the final velocity value and the final acceleration value.

3. The trajectory planning unit according to claim 1, wherein the at least one specification value comprises the initial velocity value and the initial acceleration value.

4. The trajectory planning unit according to claim 1, wherein the trajectory planning unit is adapted to receive the at least one specification value from a superordinate controller and/or from the control unit.

5. The trajectory planning unit according to claim 1, wherein the at least one specification value is different from zero.

6. The trajectory planning unit according to claim 1, wherein the trajectory planning unit is adapted to provide the trajectory in real time on the basis of the target position curve.

7. The trajectory planning unit according to claim 1, wherein the trajectory planning unit is adapted not to take into account the target position curve when generating the first acceleration curve.

8. The trajectory planning unit according to claim 1, wherein the trajectory planning unit is adapted to generate, within the trajectory generation procedure, a second acceleration curve based on the first acceleration curve, which second acceleration curve satisfies a final position value contained in the target position curve.

9. The trajectory planning unit according to claim 1, wherein the trajectory planning unit is adapted to generate the first acceleration curve based on an acceleration profile having a plurality of predetermined acceleration phases.

10. The trajectory planning unit according to claim 9, wherein the acceleration profile comprises as a first acceleration phase a first rising phase with positive slope, as a second acceleration phase a first plateau phase with constant positive acceleration, as a third acceleration phase a first falling phase with negative slope, as the fourth acceleration phase a second plateau phase with zero acceleration, as the fifth acceleration phase a second falling phase with negative slope, as the sixth acceleration phase a third plateau phase with constant negative acceleration, and as the seventh acceleration phase a second rising phase with positive slope.

11. The trajectory planning unit according to claim 9, wherein the trajectory planning unit is adapted to adjust the time durations of one or more of the acceleration phases to generate the second acceleration curve, so that the final position value contained in the target position curve is satisfied.

12. A trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value, the limit value comprising a velocity limit value, an acceleration limit value, a braking acceleration limit value and/or a jerk limit value, wherein the trajectory planning unit is adapted to provide the trajectory in accordance with at least one specification value which can be specified, the specification value comprising a velocity initial value, a velocity final value, an acceleration initial value and/or an acceleration final value, and
    wherein the trajectory planning unit is adapted to check whether the final position value contained in the target position curve can be satisfied together with the least one specification value, and wherein the trajectory planning unit is further adapted to provide, in the case where the trajectory planning unit comes to the check result that this is not possible, an auxiliary trajectory which satisfies the final position value and does not satisfy the at least one specification value.

13. A trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value, the limit value comprising a velocity limit value, an acceleration limit value, a braking acceleration limit value and/or a jerk limit value, wherein the trajectory planning unit is adapted to provide the trajectory in accordance with at least one specification value which can be specified, the specification value comprising a velocity initial value, a velocity final value, an acceleration initial value and/or an acceleration final value, and
    wherein the trajectory planning unit is adapted to, in order to provide a creepage distance, provide the trajectory with a trajectory final position value which is offset in the direction towards an initial position value with respect to a final position value contained in the target position curve.

14. The trajectory planning unit according to claim 1, wherein the trajectory comprises a trajectory position signal, a trajectory velocity signal, a trajectory acceleration signal and/or a trajectory jerk signal.

15. A trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value, the limit value comprising a velocity limit value, an acceleration limit value, a braking acceleration limit value and/or a jerk limit value, wherein the trajectory planning unit is adapted to provide the trajectory in accordance with at least one specification value which can be specified, the specification value comprising a velocity initial value, a velocity final value, an acceleration initial value and/or an acceleration final value, and
    wherein the trajectory planning unit is adapted to provide a first trajectory and a second trajectory following the first trajectory and to use the final velocity value and/or final acceleration value of the first trajectory as the initial velocity value and/or initial acceleration value of the second trajectory.

16. A valve arrangement comprising a carrier body and a plurality of plate-shaped valve modules arranged in a row on the carrier body and a control module arranged on the carrier body, which control module comprises a trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value, the limit value comprising a velocity limit value, an acceleration limit value, a braking acceleration limit value and/or a jerk limit value, wherein the trajectory planning unit is adapted to provide the trajectory in accordance with at least one specification value which can be specified, the specification value comprising a velocity initial value, a velocity final value, an acceleration initial value and/or an acceleration final value, and
    wherein the trajectory planning unit is adapted to provide a first trajectory and a second trajectory following the first trajectory and to use the final velocity value and/or final acceleration value of the first trajectory as the initial velocity value and/or initial acceleration value of the second trajectory.

17. A method for operating a trajectory planning unit for providing a trajectory as a command variable for a control unit for position control of an actuator member of an actuator, wherein the trajectory planning unit is adapted to provide the trajectory on the basis of a target position curve and to limit the trajectory according to at least one limit value, the limit value comprising a velocity limit value, an acceleration limit value, a braking acceleration limit value and/or a jerk limit value, wherein the trajectory planning unit is adapted to provide the trajectory in accordance with at least one specification value which can be specified, the specification value comprising a velocity initial value, a velocity final value, an acceleration initial value and/or an acceleration final value, the method comprising the step of: providing the trajectory on the basis of the target position curve, the at least one limit value and the at least one specification value, and wherein the trajectory planning unit is adapted to provide a first trajectory and a second trajectory following the first trajectory and to use the final velocity value and/or final acceleration value of the first trajectory as the initial velocity value and/or initial acceleration value of the second trajectory.

\* \* \* \* \*